United States Patent [19]

Rautavuori et al.

[11] 4,188,369

[45] Feb. 12, 1980

[54] METHOD OF MANUFACTURING VITREOUS CARBON

[76] Inventors: Jorma K. Rautavuori, Laulurastaantia 7, 36220 Suorama; Pertti Törmälä, Viertolankatu 38,, 33750 Tampere, both of Finland

[21] Appl. No.: 879,701

[22] Filed: Feb. 21, 1978

[30] Foreign Application Priority Data

Feb. 21, 1977 [FI] Finland .................................. 770554

[51] Int. Cl.² .............................................. C01B 31/02
[52] U.S. Cl. ..................................... 423/449; 264/29.1
[58] Field of Search ............... 423/449, 445; 264/29.1, 264/29.7, 51, 53

[56] References Cited

U.S. PATENT DOCUMENTS

| | | | |
|---|---|---|---|
| 3,109,712 | 11/1963 | Redfern | 423/449 |
| 3,342,555 | 9/1967 | McMillan | 423/449 |
| 3,949,115 | 4/1976 | Tamura et al. | 423/447.4 X |

FOREIGN PATENT DOCUMENTS 1020441  2/1966  United Kingdom ..................... 423/445

*Primary Examiner*—Edward J. Meros
*Attorney, Agent, or Firm*—James & Franklin

[57] ABSTRACT

A method of manufacturing vitreous carbon comprises the steps of providing a mixture of a thermsetting resin and an inert organic solvent. The resin is then hardened in the presence of the solvent while maintaining the temperature of the solvent below its boiling point. The temperature of the solvent is then raised above its boiling point to develop porosity in the hardened resin. The porous hardened resin is then carbonized in an inert atmosphere to form vitreous carbon.

12 Claims, No Drawings

METHOD OF MANUFACTURING VITREOUS CARBON

BACKGROUND OF THE INVENTION

This invention relates to a process for the manufacture of vitreous carbon. By carbonizing certain thermosetting polymers, bodies of vitreous carbon can be produced. Vitreous carbon is a hard, corrsion and high temperature resistant material, which has the appearance of black glass. It has been produced for example of pure phenolic resin by heating it carefully in a vacuum, inert or reducing atmosphere so that the transition from resin to vitreous carbon takes place without the body breaking or distorting.

A proper method is described for example in British Pat. No. 956,452. In this method the body of resin is heated at a temperature gradient of 1° C. per hour to 500° C., and then 5° C. per hour until 900° C. is reached. The products obtained are then allowed to cool naturally to room temperature and subsequently re-heated at a gradient of 20° C. per hour until at least 1600° C. is reached. The products obtained are then allowed to cool to room temperature in about 5 hours.

In an alternative method the temperature is raised at a rate of 5° C. per hour until 600° C. is reached, the rate is then increased to 10° C. per hour until 825° C., further increased to 20° C. per hour and the heating continued until at least 1400° C. is reached. The articles are maitained at about this temperature for about 24 hours and then allowed to cool at a temperature gradient of 20° C. per hour.

Several other modified methods have been published and they all have in common relatively low maximum wall thickness of the products if the properties of the material are wanted to be satisfactory. To increase the thickness, a method is described in British Pat. No. 1,266,685, in which the desired body is assembled of thin part bodies, which have been hardened apart. The hardened pieces are glued to joint form with phenolic resin adhesive and are carbonized to vitreous carbon. Pure phenolic resin is used as the starting material also in this method. The carbonization takes place in an argon atmosphere by raising the temperature to 900° C. over a period of 28 days and then heating to 1800° C. under a vacuum of 2 mm Hg over a period of 3 days. At the end of this heating cycle, the body is allowed to cool.

Characteristic of the manufacturing method used today is slowness and hence expensiveness. When using pure resin as the starting material, a rapid rate of heating can not be used because the pressure of the evolving pyrolysis gases from the body becomes too great and the body will be damaged.

DETAILED DESCRIPTION OF THE PREFERRED EMBODIMENTS

In this method phenolic resin, suitable solvent (e.g. ethyl alcohol) and hardener (e.g. p-toluene sulphonic acid) are used. During the hardening stage the solvent is left inside the body homogeneously dispersed. The solvent does not chemically react with the polymer, and so it can be removed from a polymer matrix at the temperature higher than the boiling point of the solvent. This takes place during the post-curing stage or at the latest at the early stage of carbonizing. When the solvent molecules have left the polymer matrix, a porous structure is achieved that makes possible a relatively rapid rate of heating, because there is room for the pyrolysis gases to evolve from the body without causing too high a pressure, which might damage the body. In the transition from resin to vitreous carbon, the development of pores takes place due to evolving pyrolysis gases, and these pores then collapse at higher temperature. The same also happens to the pores due to the solvent evaporation.

The following example is given for the purpose of illustrating the invention.

EXAMPLE 40 g "Tammer F3" phenolic resin (manufactured by Aaltosen Tehtaat Oy, Sarvis, Tampere, Finland), 9 ml 99,5wt-% ethyl alcohol and 4 ml 75 wt-% paratoluene sulphonic acid are mixed. The mixture is vacuum degassed and mixed homogeneous at normal pressure. The mixture is poured into the test tube and hardened at a temperature of 50°-60° C. for about 60 minutes and then allowed to cool. The rod is cut into pieces, which are kept at a temperature of 190° C. for 5 hours, after which the temperature is raised at the rate of 20° C. per hour until about 640° C. is reached and hereafter the temperature is raised in 30 minutes up to 1000° C., the bodies being in nitrogen atmosphere. After this, the bodies are allowed to cool. During carbonization about 27% linear shrinkage takes place.

We claim:

1. A method of manufacturing a vitreous carbon body comprising the steps of
    (a) providing a mixture of a thermosetting resin and an inert organic solvent;
    (b) hardening the resin in the presence of the solvent while maintaining the temperature of the mixture below the boiling point of the solvent to produce a hardened resin body containing substantially all of said solvent dispersed therein;
    (c) raising the temperature of the hardened resin body above the boiling point of the solvent to remove the solvent therefrom and to develop porosity in said hardened resin body; and
    (d) carbonizing the porous hardened resin body in an inert atmosphere to form a vitreous carbon body.

2. The method of claim 1 wherein the resin is hardened in step (b) at an elevated temperature.

3. The method of claim 1 wherein the mixture further includes a hardener.

4. The method of claim 1 wherein the resin is a liquid resin.

5. The method of claim 4 wherein the resin is phenol formaldehyde.

6. The method of claim 1 wherein the solvent is ethyl alcohol.

7. The method of claim 5 wherein the solvent is ethyl alcohol.

8. The method of claim 1 wherein the resin is hardened in step (b) at a temperature of about 50°-60° C. for a period of about one hour.

9. The method of claim 1 wherein the hardened resin body is maintained in step (c) at a temperature above the boiling point of the solvent for about 5 hours.

10. The method of claim 1 wherein the porous hardened resin body is carbonized in step (d) in about 23 hours.

11. The method of claim 10 wherein the porous hardened resin body is carbonized in step (d) by heating it to a temperature of about 1,000° C.

12. The method of claim 1 wherein the porous hardened resin body is carbonized in step (d) by heating it to a temperature of about 1,000° C.

* * * * *